(12) United States Patent
Perlman et al.

(10) Patent No.: US 6,788,680 B1
(45) Date of Patent: Sep. 7, 2004

(54) DEFFERRABLE PROCESSING OPTION FOR FAST PATH FORWARDING

(75) Inventors: Radia J. Perlman, Acton, MA (US); Joseph E. Provino, Cambridge, MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/383,086

(22) Filed: Aug. 25, 1999

(51) Int. Cl.⁷ .............................................. H04L 12/28
(52) U.S. Cl. ..................................... 370/389; 370/429
(58) Field of Search ................................ 370/389, 390, 370/391, 392, 393, 394, 429, 432, 474, 475, 261, 270, 445, 458, 401, 428, 397, 395.61, 254; 709/202, 238, 249, 250, 245

(56) References Cited

U.S. PATENT DOCUMENTS

| | | | | |
|---|---|---|---|---|
| 5,062,106 A | * | 10/1991 | Yamazaki et al. | 370/397 |
| 5,442,633 A | * | 8/1995 | Perkins et al. | 370/331 |
| 5,570,084 A | * | 10/1996 | Ritter et al. | 370/338 |
| 5,940,399 A | * | 8/1999 | Weizman | 370/445 |
| 6,119,171 A | * | 9/2000 | Alkhatib | 370/390 |
| 6,122,665 A | | 9/2000 | Bar et al. | 709/224 |
| 6,147,976 A | * | 11/2000 | Shand et al. | 370/254 |
| 6,160,808 A | * | 12/2000 | Maurya | 370/389 |
| 6,212,185 B1 | * | 4/2001 | Steeves et al. | 370/392 |

\* cited by examiner

*Primary Examiner*—Dang Ton
*Assistant Examiner*—Phuc Tran
(74) *Attorney, Agent, or Firm*—Foley Hoag LLP

(57) ABSTRACT

A system and method for providing deferred processing of information within a received data unit. An indication of a deferrable processing option in a received packet is detected, such as a particular option type or flag, as well as other deferred processing control parameters, and some relevant portion of the packet is stored. The received packet may then be forwarded out of the device, without waiting for the deferred processing to be completed. The deferred processing may be performed in parallel, or subsequent to, forwarding of the packet. The disclosed system is embodied in a networking device such as a router, which includes a fast processing path for packet forwarding functions, and a relatively slow processing path for other functions such as network management. Detection of the deferred processing indication and copying of the relevant packet portion are performed in the fast path. Deferred processing itself may be performed in the slow path.

40 Claims, 4 Drawing Sheets

DEFFERRABLE PROCESSING OPTION FOR FAST PATH FORWARDING

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

Networking devices are typically designed to process received packets at high speeds. For example, a network switch must perform high speed packet forwarding so that it does not become a bottleneck on packet throughput within the network. High speed processing of received packets usually requires custom designed hardware circuitry, as may be provided by one or more Application Specific Integrated Circuits (ASICs). While all functions of the device could be performed by such high speed hardware, the costs associated with designing, debugging, and manufacturing such circuits increase significantly with their functional complexity. Accordingly, the functions provided by such devices are often divided into two categories: "core" functions processed within a high speed, hardware processing path (referred to as the "fast forwarding path", or "fast path"), and other functions processed outside the fast path, using lower cost, lower speed components.

For example, a router typically has its routing functionality implemented in a number of application specific integrated circuits (ASICs) to permit high speed forwarding of received packets. The hardware used to provide this fast path is often provided on a per-port basis, so that each port is provided with dedicated logic for processing packets passing through it. A slower processing path, which may be implemented by a shared management subsystem of the device, is also provided to perform functions not performed by the fast path. Functions performed in the slower processing path include, for example, processing of packets containing certain Internetworking Protocol (IP) options fields. One such IP option permits the source of a packet to indicate, within the packet, a specific route through the network which the packet must take to its destination. Since processing of packet information in this relatively slower path is often done under microprocessor control, it is sometimes referred to as the "microprocessor path". However, since this slower path may be any secondary processing path of the device other than the fast path, whether it is implemented using a microprocessor or some other processing technology, it is referred to herein as the "slow path".

In existing networking devices, most received packets are processed completely using the fast path only. Some relatively small subset of received packets are forwarded to the slow path, including, for example, SNMP (Simple Network Management Protocol) packets. Those packets forwarded to the slow path are processed using the management subsystem, and then forwarded through an output port of the device or discarded.

Typical data units ("packets") used to convey messages between nodes in a communications network include one or more header portions, in addition to a data portion. Packet headers are often provided with a fixed part and a variable part. Specifically, an IP header for an IP packet includes a variable length part including some number of optional fields, referred to as "options". The options within the packet header are encoded using a form of type, length, value (TLV) encoding. Specific options may or may not be supported by each networking device. When a device determines that an option within a received packet is not supported, the type of the option controls whether the packet must be dropped at that device, or whether the option can be skipped, and the remainder of the packet processed as needed. In this sense, existing options may be considered to fall within one of two categories: 1) those requiring the receiver to drop the received packet if the option is not understood, and 2) those requiring the receiver to simply skip the option if it is not supported.

In many networking devices, when any optional field is detected in a received packet, the entire packet is passed over to the slow path for processing of the option prior to the packet being forwarded from the device. Other existing systems provide processing of some options in the fast path, while other options require passing the packet to the slow path, which processes the option and then causes the packet to be forwarded if necessary. A significant drawback of such designs is that they delay forwarding of a received packet which includes an option field until after the option has been completely processed. This effectively limits the use of options, since any options that are processed by a networking device such as a router, and that are included in packets that must be forwarded, may increase the delay experienced by those packets at the router.

Accordingly it would be desirable to have a system for performing optional processing of a received data unit, which does not introduce undue delay into the packet forwarding process. The system should permit support for new options to be conveniently added and be compatible with existing systems.

BRIEF SUMMARY OF THE INVENTION

A system and method for providing deferred processing of information within a received data unit is disclosed, in which the data unit is forwarded as usual, and a portion of the packet is also stored for processing independent of the packet forwarding. The system detects whether the received data unit includes an indication of deferrable processing, such as a particular option type or flag. Option type ranges and multiple flags may be used to indicate various portions of the received packet that are to be stored for deferred processing, as well as whether individual or multiple copies of duplicate packets or packets with common characteristics should be stored. The number of packets or packet portions that can be stored may also be determined by cache sizes or system configuration parameters. An example of a packet portion that is stored is the packet header, such as an IP header in the case where the deferred processing indication is contained within the IP header's optional portion.

After the system stores the portion of the packet, if any, that is needed to perform the deferred processing, the received packet may then be forwarded out of the receiving device, and the deferred processing may be started. The deferred processing may be performed later, for example as necessary resources become available. The deferred processing may also be performed in parallel with packet forwarding, but need not complete before the received packet is forwarded. In this way, completion of the deferred processing is not a bottle neck with regard to packet forwarding throughput.

The disclosed system is advantageously embodied in a networking device, such as a router, having a fast received packet processing path (the "fast path"), as well as a slower received packet processing path (the "slow path"). In such an embodiment, the disclosed system includes detection of a deferred processing indication by the fast path, which then stores the packet or necessary portion thereof, in addition to forwarding the packet. Adding support for deferred processing detection, as well as support for storage of packets or portions thereof, to the fast path introduces some minimal additional hardware complexity, but does not require the actual deferred processing to be performed by the fast path logic. Moreover, the disclosed system is conveniently extensible, since introducing support for new varieties of deferred processing to a device often will only require loading a new microprocessor program image.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
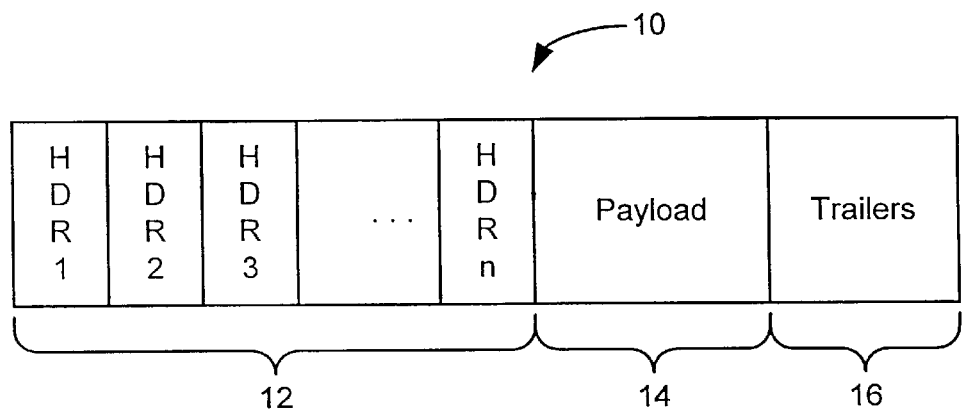
FIG. 1 shows an illustrative packet format having multiple packet headers.

Consistent with the present invention, a system and method for deferred option processing is disclosed which detects an indication of deferred processing within a header of a received packet. As shown in FIG. 1, the format 10 of a typical data packet includes a payload section 14 in which the data being transferred by the packet is stored, as well as one or more headers 12, shown as HDR1 through HDRn. The headers 12 typically correspond to layers of a communications protocol stack used to transfer the packet. For example, a first header (HDR1) corresponds to a media access control (MAC) layer, a second header (HDR2) corresponds to a higher layer, such as the internetworking protocol (IP) layer, and so on. Each header includes addressing, connection, and other information that is processed by the corresponding layer of the protocol stack. A well known example of a protocol stack is the TCP/IP protocol stack. The packet may also include some number of trailers 16, containing, for example, cyclic redundancy codes used to detect communication errors.

Figure 2:
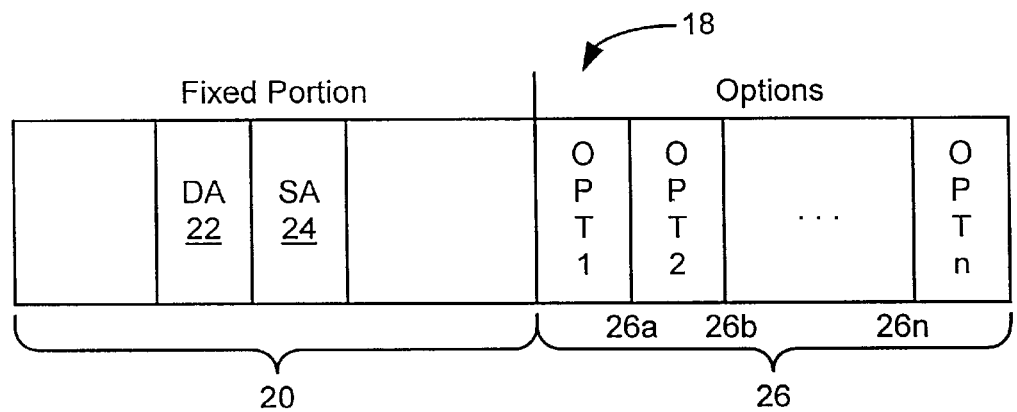
FIG. 2 shows an illustrative packet header having a fixed portion and an options portion.
Figure 3:
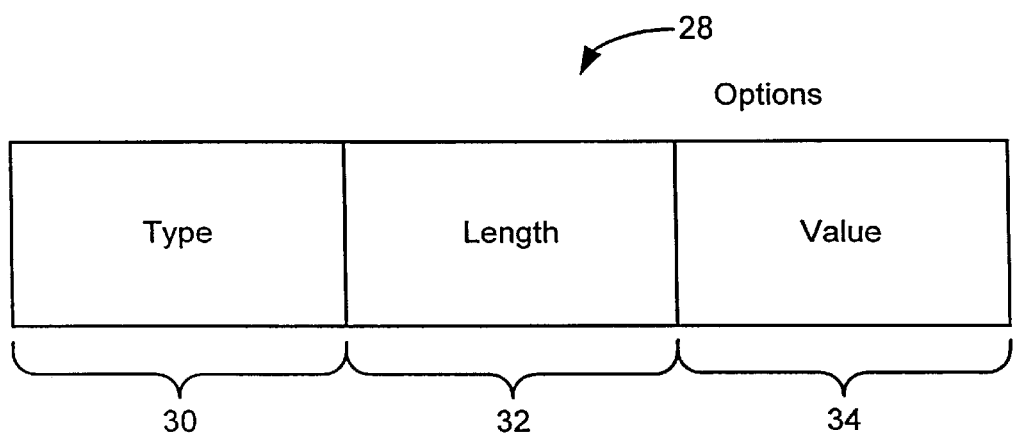
FIG. 3 illustrates a type, length, value (TLV) encoded option field format.

FIG. 2 depicts an example of a packet header 18 including a fixed portion 20 and a variable length options portion 26. The fixed portion 20 includes a destination address 22 and a source address 24. The options portion 26 includes some number n of optional fields OPT1 26a, OPT2 26b, . . . OPTn 26n. The options portion is used to indicate specific kinds of optional processing to be performed by a device receiving a packet including packet header 18. FIG. 3 shows an illustrative format of optional fields in the options portion 26 of the packet header 18. The type, length, value (TLV) encoding of FIG. 3 includes a type field 30, a length field 32, and a value field 34. The value stored in the type field 30 includes an indication of an option category. Each option falls within at least one of three categories, specifically 1) those options requiring the receiver to drop the received packet including this option if the option is not supported, 2) those options requiring the receiver to simply skip this option if it is not supported, and 3) those options indicating that processing required by this option may be deferred. The length field 32 contains a value indicating the length of the option field 28, while the value field 34 contains a value or other data used during processing of the option field 28.

Figure 4:
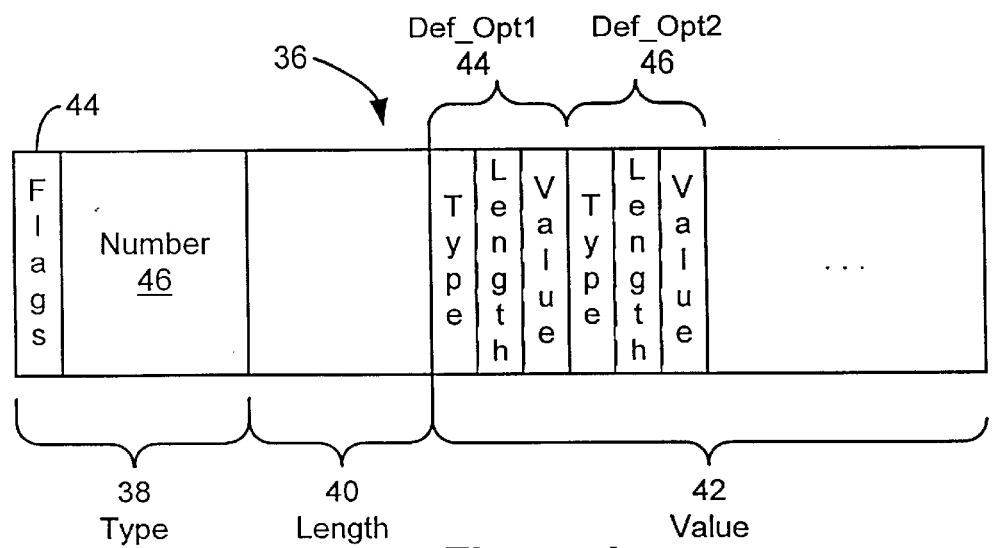
FIG. 4 shows a second illustrative option field format.

FIG. 4 shows a second illustrative option field format 36. The option field format 36 includes a type field 38, length field 40, and value field 42. The type field 38 includes flags 44 and an option number 46. The flags 44 or option number 46 include an indication that processing of this option may be deferred. The length field 40 indicates the length of the option, and the value field 42 includes one or more TLV encoded deferrable options, including a first deferrable option 44 and a second deferrable option 46. In this way, the option field format shown in FIG. 4 permits multiple deferrable options to be supported, even though only one flag bit or option number in the type field 38 need be reserved to indicate that deferrable option processing may be employed by the receiving device. In an illustrative embodiment compatible with the IP packet format, a reserved value found within a two bit "class" field within flags 44 indicates processing of the option may be deferred.

Figure 5:
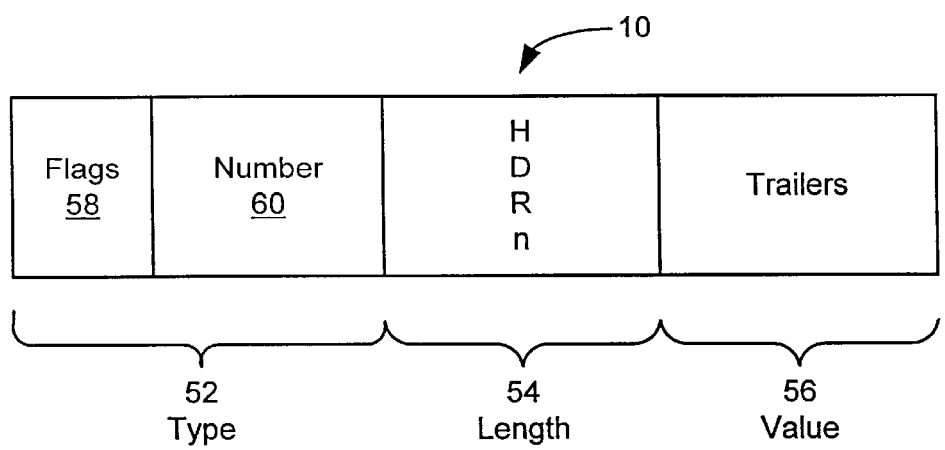
FIG. 5 shows a third illustrative option field format.

FIG. 5 shows a third illustrative option field format, having type 52, length 54, and value 56 fields. The type field 58 includes flags 58 and an option number 60. The permitted values that may be included within the option number field 60 include a range of option numbers which are associated with options for which processing may be deferred. The deferred processing option number range is further subdivided into sub-ranges, where each sub-range of values is associated with a particular amount of the received packet to be stored for deferred processing. For example, deferrable option number values within a first sub-range indicate that only the packet header including the option field 50 should be stored for deferred processing, while deferrable option number values within a second sub-range indicate that the entire received packet should be stored.

Figure 6:
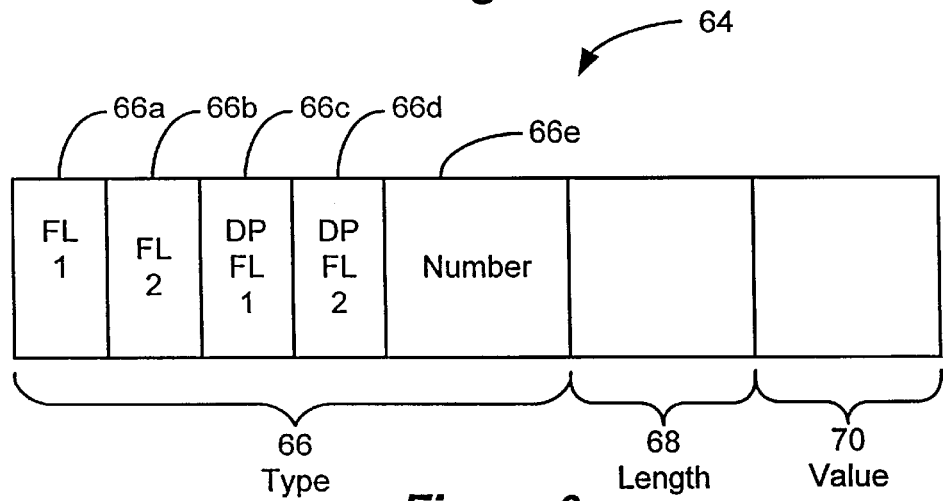
FIG. 6 shows a fourth illustrative option field format.

FIG. 6 shows a fourth illustrative option field format 64, including type 66, length 68 and value 70 fields. The type field 66 is shown further including flag 1 66a, flag 2 66b, as well as a first deferred processing flag 66c and a second deferred processing flag 66d. In a first predetermined state, the first deferred processing flag 66c indicates that processing of the option field 64 may be deferred until after the received packet has been forwarded. In a first predetermined state, the second deferred processing flag 66d indicates that the whole received packet is to be stored for deferred processing. If the deferred processing flag 66d is in a second predetermined state, then only the packet header is to be stored for deferred processing. Other deferred processing flags are provided in alternative embodiments, including flags indicating: 1) that each received packet having the flag set should be stored, 2) that only the most recently received packet having the flag set should be stored, 3) that only the most recently received packet having the flag set should be stored for a given destination address (DA) value within the header of the received packet, and 4) that only the most recently received packet having the flag set should be stored for a given destination address (DA)/source address (SA) combination. Each of these indications may alternatively be associated with a specific range of option numbers stored in the number field 60 of FIG. 5, the number field 46 of FIG. 4, or the type field 30 of FIG. 3.

Figure 7:
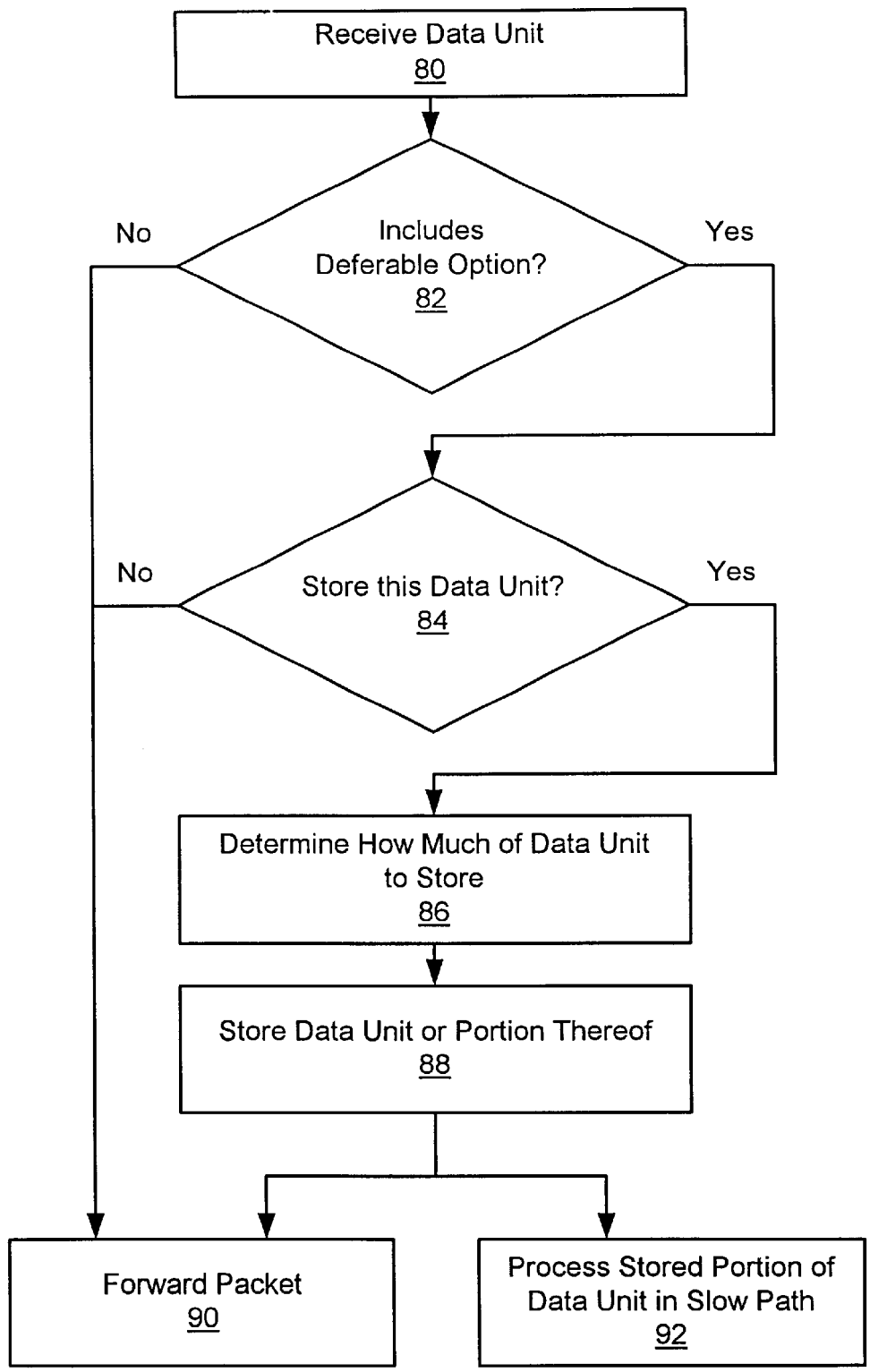
FIG. 7 shows steps performed by the disclosed invention to process a received packet.

FIG. 7 shows steps performed to process a received packet. The steps shown in FIG. 7 may be performed by a networking device such as a router, which includes a fast packet processing path implemented predominantly in hardware, and a microprocessor controlled packet processing path, which operates at a relatively slower rate. At step 80, the network device receives a data unit, such as an IP packet, which is initially processed within the fast packet processing path. At step 82, the hardware logic of the fast packet processing path determines whether the received packet includes an indication of an option whose processing may be deferred. If such indication of deferrable processing is detected, then step 82 is followed by step 84. Otherwise, step 82 is followed by step 90, in which processing of the received packet is completed, for example by the fast processing path.

At step 84, the fast packet processing path logic determines whether to store some portion of the received packet. For example, the received packet itself may indicate that only the most recently received packet of a particular type or class should be stored for deferred processing, or that every such received packet should be stored, or that only one such packet should be stored. Various approaches may be used to determine what portion of the received packet should be stored for deferred processing, based on the contents of the received packet. Such approaches include:

determining the portion of the received packet to store for deferred processing based on offset values within the received packet indicating a beginning byte and an ending byte;

determining the portion of the received packet to store for deferred processing based on an offset value within the received packet indicating a beginning byte, together with a length value within the received packet;

determining the portion of said received packet to store for deferred processing based on the type of the received packet;

determining the portion of the received packet to store for deferred processing based on a beginning offset value within the received packet, where the portion of the received packet to store is the remainder of the packet starting with the byte at the beginning offset; and/or determining a size of the portion of the received packet to store for deferred processing responsive to a length value in the received packet, where the portion to store is the received packet up to the number of bytes indicated by the length value.

Additionally, the disclosed system may be implemented such that two or more contiguous regions within the received packet are stored for deferred processing. The locations of such multiple regions to be stored may be determined using multiples and/or combinations of the above listed techniques for locating a single portion to be stored. Furthermore, a preferred method for identifying portions to be stored includes use of a bit mask within the received packet. In the bit mask, each bit corresponds to a respective contiguous portion of the received packet, for example 64 contiguous bytes. When a bit in the bit mask is in a first predetermined state, for example set (equals "1"), then a corresponding 64 byte "chunk" of the received packet is to be stored for deferred processing.

Limits on storing packets may occur as a result of memory limitations. If the received packet is not to be stored, then step 84 is followed by step 90, where processing of the received packet is completed, for example using the fast packet processing path. Otherwise, step 84 is followed by step 86.

At step 86, the fast packet processing path logic determines how much of the received packet should be stored for deferred processing. For example, the packet may include indication that only the header should be stored, or that the entire received packet should be stored. At step 88, the fast packet processing path stores that portion of the packet determined at step 86. Following step 88, steps 90 and 92 may be performed in parallel. In step 90, the fast packet processing path completes processing of the received packet, for example by forwarding the packet to an output port on the device in response to addressing information within the packet, in combination with routing tables or other routing data structures within the device. In step 92, the specific type of deferred processing required by the received packet is performed as resources become available to do so. The deferred processing performed in step 92 may be performed by the microprocessor controlled packet processing path, independent from, and without interfering with, the forwarding of the packet performed by the fast packet processing path in step 90. For example, deferred processing performed in step 92 may relate to congestion detection and avoidance, compilation of statistics with regard to various network management parameters, and/or modification of the configuration or behavior of the receiving network device. Deferred processing of an option may cause the receiving networking device to change its receive buffer allocation for a connection or data stream associated with the received packet. Additionally, deferred processing related information from multiple packets may be combined for combined processing, or for transmission to another system.

Figure 8:
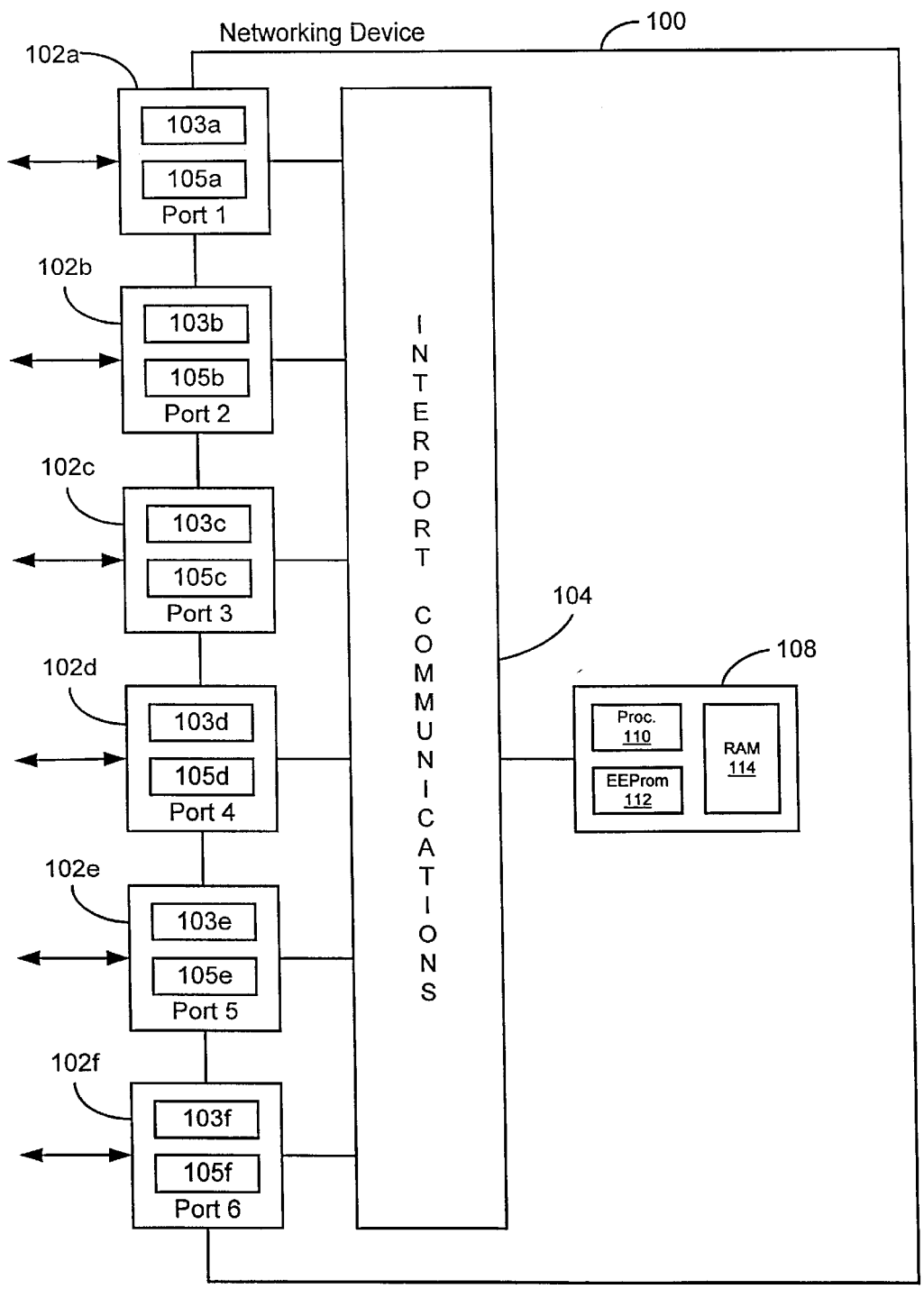
FIG. 8 shows an illustrative networking device in which the disclosed system may be embodied.

The disclosed system may advantageously be embodied within a networking device 100, as shown in FIG. 8. The networking device 100 of FIG. 8 includes a number of input/output ports 102*a* through 102*g*, which connect the device to various network transmission media. Each of the ports 102 include fast path processing logic 103, and some amount of buffering 105 for storing received packets. The ports 102 are further coupled to an inter-port communication system 104, which may include a shared bus, shared memory, and/or cross-connect switching system that allows packets to be moved between the ports 102. The communication system 104 is further coupled to a management subsystem 108. The fast path processing logic 103, for example, consists of one or more Application Specific Integrated Circuits (ASICS). The fast path processing logic 103 implements packet forwarding functionality, as is necessary to support routing of Internet Protocol (IP) packets. During processing of a received packet at a first one of the ports 102, the fast path processing logic 103, for example, determines an output port within the ports 102, in response to information contained within the header of the received packet, and places the received packet onto an output queue associated with that output port. The fast path processing logic 103 further operates to detect indications of deferrable processing in received packets, and to copy at least a portion of received packets for use during any such deferrable processing. The deferrable processing is performed in addition to, and independent from processing performed by the fast path processing logic 103 to forward received packets which include indication of such deferrable processing.

The management subsystem 108 includes a microprocessor 110, a random access memory (RAM) 114 from which program code executes, and an electrically erasable read only memory (EEPROM) 112 for storing the executable program code image. The management subsystem 108 operates in significant part to perform deferred processing on packets or portions of packets stored by the fast path processing logic 103.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method of processing a received data unit in a networking device, the method comprising:

determining whether said received data unit includes an indication that at least a portion of the processing of said received data unit is to be deferred;

determining in response to said indication, a location of a portion of said received data unit to be used during said deferred processing of said received data unit, said portion of said received data unit including at least a part of a non-header portion of said received data unit;

storing a copy of said portion of said received data unit;

forwarding said received data unit; and performing said deferred processing after and independently of said forwarding and in response to said portion of said received data unit.

2. The method of claim 1, wherein said indication is included within at least a portion of an option field within a header portion of said received data unit.

3. The method of claim 2, wherein said portion of said option field comprises a predetermined value.

4. The method of claim 3, wherein said option field includes a type part, a length part, and a value part, and said portion of said option field comprises said type part.

5. The method of claim 4, wherein said value part of said option field includes at least a second option field, wherein said second option field includes a type part, a length part, and a value part.

6. The method of claim 3, further comprising determining whether to store a copy of all of said received data unit or a copy of said portion of said received data unit in response to said predetermined value.

7. The method of claim 2, wherein said portion of said option field comprises a flag bit having a predetermined value.

8. The method of claim 1, wherein said indication is included within at least one field of a fixed portion within a header portion of said received data unit.

9. The method of claim 2, wherein said option field within said header portion of said received data unit is one of a plurality of option fields within said header portion of said received data unit.

10. The method of claim 9, wherein said header portion of said data unit is an internetworking protocol (IP) header.

11. The method of claim 1, further comprising determining said location of said portion of said received data unit in response to an indication of a beginning byte and an indication of an end byte included within said received data unit.

12. The method of claim 1, further comprising determining said location of said portion of said received data unit in response to an indication of a beginning byte and a length indication included within said received data unit.

13. The method of claim 1, further comprising determining said location of said portion of said received data unit in response to a type of said received data unit.

14. The method of claim 1, wherein said portion of said received data unit includes a plurality of contiguous regions within said received data unit.

15. The method of claim 14, further comprising determining said location of each of said plurality of contiguous regions within said received packet in response to a respective plurality of offsets within said received data unit.

16. The Method of claim 1, further comprising determining said location of said portion of said received data unit in response to an indication of a beginning byte within said received data unit, and wherein said portion of said received data unit includes the remainder of said received data unit beginning with said beginning byte.

17. The method of claim 1, wherein said deferred processing is performed at least in part using a microprocessor executing a computer program within said networking device.

18. The method of claim 17, wherein said forwarding of said data unit is performed by said networking device without using said microprocessor executing a computer program within said networking device.

19. The method of claim 1, wherein said networking device is a router.

20. The method of claim 1, wherein said networking device includes a first data unit processing path and a second data unit processing path, wherein said second data unit processing path performs processing of received data units at least in part using a microprocessor within said networking device, and wherein said performing said deferred processing is performed by said second data unit processing path.

21. The method of claim 20, wherein said determining whether said received data unit includes an indication that the processing of said received data unit is to be deferred is performed by said first data unit processing path.

22. The method of claim 20, wherein said storing said copy of said portion of said received data unit is performed by said first data unit processing path.

23. The method of claim 20, wherein said forwarding of said received data unit is performed by said first data unit processing path.

24. A method of processing a received data unit in a networking device, the method comprising:

determining whether said received data unit includes an indication of deferrable processing, said indication of deferrable processing being included within at least a portion of an option field within a header portion of said received data unit, said portion of said option field including a flag bit having a predetermined value;

storing a copy of a portion of said received data unit associated with said indication;

forwarding said received data unit;

performing said deferrable processing; in response to said portion of said received data unit, and, at least in part, after said forwarding of said received data unit; and determining whether to store a copy of all of said received data unit or a copy of a header of said received data unit responsive to a second flag bit of said option field.

25. A method of processing a received data unit in a networking device, the method comprising:

determining whether said received data unit includes an indication of deferrable processing;

storing a copy of a portion of said received data unit associated with said indication, said portion of said received data unit associated with said indication including a plurality of contiguous regions within said received data unit;

forwarding said received data unit;

performing said deferrable processing, in response to said portion of said received data unit, and, at least in part, after said forwarding of said received data unit; and determining a location of each of said plurality of contiguous regions within said received data unit in response to a bit mask, each bit within said bit mask indicating, in a first predetermined state, one of said plurality of contiguous regions.

26. The method of claim 25, wherein each one of said bits in said bit mask is associated with a predetermined portion of said received data unit.

27. A method of processing a received data unit in a networking device, the method comprising:

determining whether said received data unit includes an indication of deferrable processing;

storing a copy of a portion of said received data unit associated with said indication;

forwarding said received data unit;

performing said deferrable processing, in response to said portion of said received data unit, and, at least in part, after said forwarding of said received data unit; and determining a size of said portion of said received data unit associated with said indication in response to an indication of a length of said portion of said received data unit associated with said indication, said length included in said received data unit, said portion of said received data unit associated with said indication beginning at a beginning of said received data unit.

28. A method of processing a received data unit in a networking device, the method comprising:
   determining whether said received data unit includes an indication of deferrable processing;
   determining, in response to said received data unit, a location of a portion of said received data unit associated with said indication, a copy of said portion of said received data unit associated with said indication to be stored for said deferrable processing, said portion of said received data unit associated with said indication including at least a part of a non-header portion of said received data unit;
   storing a copy of said portion of said received data unit associated with said indication;
   forwarding said received data unit; and
   performing said deferrable processing, in response to said portion of said received data unit, and, at least in part, after said forwarding of said received data unit;
   wherein said deferrable processing includes determining a level of network performance in response to said stored portion of said received data unit.

29. A networking device, comprising:
   packet processing logic including logic for
      detecting an indication that at least a portion of the processing of a received data unit is to be deferred,
      determining, in response to said indication, a location of a portion of said received data unit, said portion of said received data unit to be used during said deferred processing, said portion of said received data unit including at least a part of a non-header portion of said received data unit,
      storing a copy of said portion of said received data unit, and
      forwarding said received data unit from a first communications interface to a second communications interface for transmission from said networking device; and
   a microprocessor based subsystem for performing said deferred processing after and independently of said forwarding of said received data unit by said packet processing logic, in response to said portion of said received data unit.

30. The networking device of claim 29, wherein said indication is included within at least a portion of an option field within a header portion of said received data unit.

31. The networking device of claim 30, wherein said option field within said header portion of said received data unit is one of a plurality of option fields within said header portion of said received data unit.

32. The networking device of claim 31, wherein said header portion of said received data unit is an internetworking protocol (IP) header.

33. The networking device of claim 30, wherein said portion of said option field comprises a predetermined value.

34. The networking device of claim 33, wherein said option field includes a type part, a length part, and a value part, and said portion of said option field is said type part.

35. The networking device of claim 30, wherein said portion of said option field comprises a flag bit having a predetermined value.

36. The networking device of claim 34, wherein said value part of said option field includes at least a second option field, wherein said second option field includes a type part, a length part, and a value part.

37. The networking device of claim 33, wherein said microprocessor based subsystem is further operable to determine whether to store a copy of all of said received data unit or a copy of said portion of said received data unit responsive to said predetermined value.

38. The networking device of claim 29, wherein said networking device is a router.

39. A networking device, comprising:
   packet processing logic including logic for
      detecting an indication of deferrable processing, said indication of deferrable processing included within at least a portion of an option field within a header portion of a received data unit, said portion of said option field including a first flag bit having a predetermined value,
      storing a copy of at least a portion of said received data unit for access during said deferrable processing,
      forwarding said received data unit from a first communications interface to a second communications interface for transmission from said networking device, and
      whether to store a copy of all of said received data unit or a copy of a header of said received data unit in response to a second flag bit of said option field; and
   a microprocessor based subsystem for performing said deferrable processing, at least in part, after said forwarding of said received data unit by said packet processing logic.

40. A networking device, comprising:
   packet processing logic including logic for
      detecting an indication of deferrable processing in a received data unit,
      determining, in response to said received data unit, a location of a portion of said received data unit associated with said indication, a copy of said portion of said received data unit associated with said indication to be stored for said deferrable processing, said portion of said received data unit associated with said indication including at least a part of a non-header portion of said received data unit,
      storing a cops of said portion of said received data unit for access during said deferrable processing, and
      forwarding said received data unit from a first communications interface to a second communications interface for transmission from said networking device; and
   a microprocessor based subsystem for performing said deferrable processing, at least in part, after said forwarding of said received data unit by said packet processing logic, and wherein said deferrable processing includes determining a level of network performance in response to said stored portion of said received data unit.

* * * * *

UNITED STATES PATENT AND TRADEMARK OFFICE
CERTIFICATE OF CORRECTION

PATENT NO. : 6,788,680 B1
DATED : September 7, 2004
INVENTOR(S) : Perlman et al.

It is certified that error appears in the above-identified patent and that said Letters Patent is hereby corrected as shown below:

Title page,
Item [54], Title, please change "DEFFERRABLE" to -- DEFERRABLE --.

Signed and Sealed this

Twenty-third Day of November, 2004

JON W. DUDAS
*Director of the United States Patent and Trademark Office*